Nov. 5, 1957 M. P. MacMARTIN ET AL 2,812,447
FLAW DETECTOR FOR CONTINUOUS SHEET MATERIAL
Filed May 18, 1956
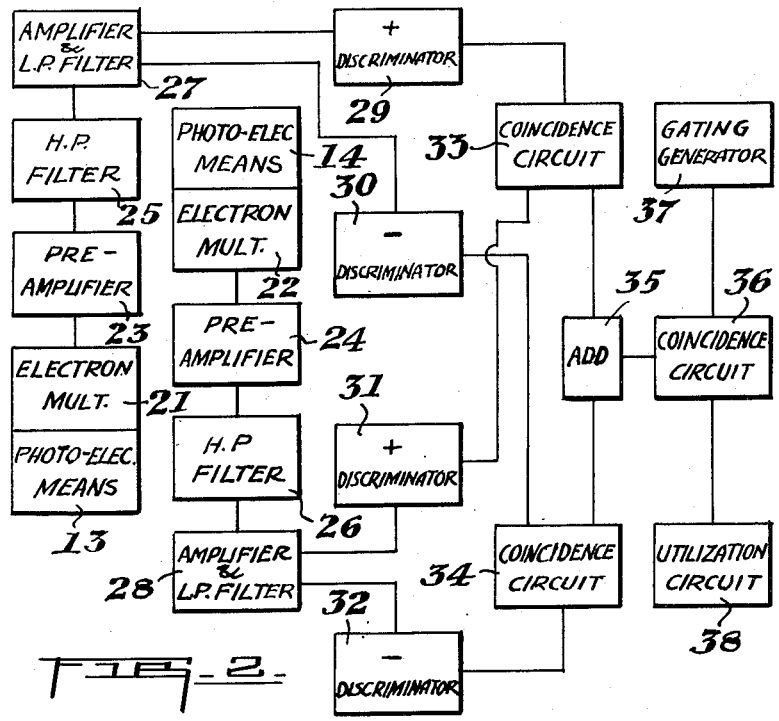
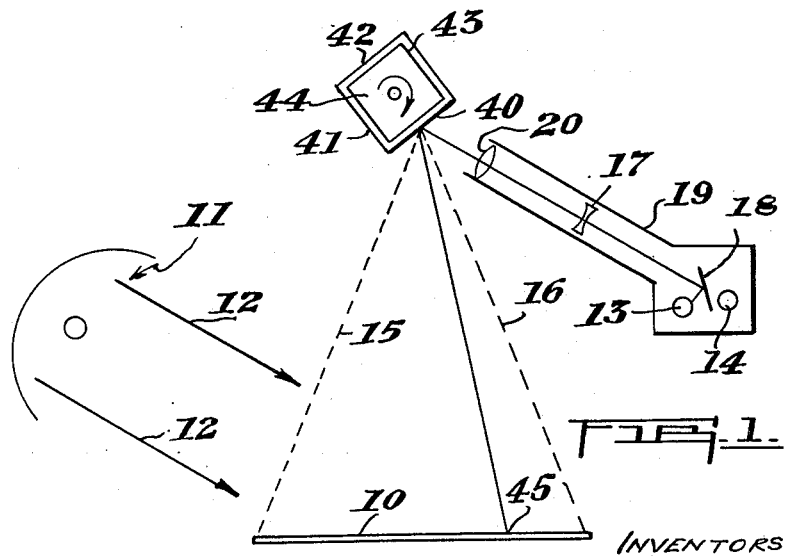
INVENTORS
MALCOLM P. MACMARTIN
& NORBERT L. KUSTERS
BY—Smart & Biggar
ATTORNEYS

United States Patent Office 2,812,447
Patented Nov. 5, 1957

2,812,447

FLAW DETECTOR FOR CONTINUOUS SHEET MATERIAL

Malcolm P. MacMartin and Norbert L. Kusters, Ottawa, Ontario, Canada, assignors to National Research Council, Ottawa, Ontario, Canada, a body corporate of Canada Application May 18, 1956, Serial No. 585,712

5 Claims. (Cl. 250—214)

This invention relates to an automatic flaw detector for continuous sheet material such as paper.

In the manufacture of high quality paper, it is necessary to examine and sort the paper to remove defective sheets before packing and shipping since defects such as wrinkles, drops of oil, dirt, calendar stamps, etc., may occur in the process of manufacturing. A great deal of attention has been given to developing automatic means to detect flaws in sheet material. One proposal is to mount a photo-electric cell above the paper at an inspection station where it would be illuminated by light reflected from the paper, and to rotate a series of lenses concentrically about the photo-electric cell. The lenses are adapted to focus on a small spot on the paper and the rotation of the lenses provides scanning of the paper. Defects in the paper cause a change in the intensity of the light reflected and normally result in a pulse in the output of the photo-electric cell. Undesired signals due to 60 cycle flicker of the lights illuminating the paper, flutter of the paper at the inspection station, etc. will also appear on the output of the photo-electric cell. In addition the amplifiers required to amplify the output of the photo-electric cell to a useable level introduce random noise signals as well as amplifying noise picked up by and generated in the photo-electric cells. It has been proposed to reduce the amplitude of these undesired signals by using filter circuits. However, under practical operating conditions it is difficult to filter the undesired signals down to a desired level without distorting the normal pulse output caused by flaws in the paper.

Due to the disadvantages of the automatic means hitherto available to detect flaws in sheet material it has been necessary to resort to manual inspection and sorting particularly in the case of high quality paper. This is done by experienced personnel examining each individual sheet and removing the defective sheets. The main disadvantages of hand sorting are the high costs, the time required, and the fact that it is not very uniform since it depends on the judgment of individuals. A paper machine may be making paper which is all imperfect, for example, it may have a calendar stamp every few feet on the web, and this will probably not be known until several hours later, at which time several tons of bad paper may have been made.

The present invention provides a sensitive and automatic flaw detector for continuous sheet material which reduces the need for hand sorting of high quality products. According to the present invention the continuous sheet material is continuously advanced through an illuminated inspection area where it is scanned by two photo-electric means each of which supplies a signal to a coincidence circuit when a flaw is detected by the two photo-electric means.

According to one feature of the invention at least one discriminator circuit is connected between each of the photo-electric means and a first coincidence circuit. Each discriminator circuit is adapted to provide an output signal in response to an input signal that exceeds a predetermined voltage level. A gating generator circuit may be connected to a second coincidence circuit which is also connected to the output of the first coincidence circuit. The gating generator circuit is adapted to provide an output while the material is being scanned and the second coincidence circuit is adapted to indicate the simultaneous presence of a signal from the gating generator circuit and from the first coincidence circuit.

According to a preferred embodiment of the invention the flaw detector consists of means for advancing the continuous sheet material past an inspection area, means for illuminating the sheet material in the inspection area, a first and a second photo-electric means, a first and a second pulse amplitude discriminator circuit connected to the outputs of the first photo-electric means, a third and a fourth pulse amplitude discriminator circuit connected to the output of the second photo-electric means, a first coincidence circuit connected to the outputs of the first and third discriminator circuits, a second coincidence circuit connected to the second and fourth discriminator circuit, reflection means adapted to reflect light from a small area of the material onto the photo-electric means, and a transmission-reflection mirror positioned between the photo-electric means and the reflection means. The size and shape of the area on the material from which light is reflected onto the photo-electric means is defined by the image of an aperture at the photo-electric means. The aperture may be the photosensitive area of the photo-electric means. The reflection means is adapted to bend the beam of light to the photo-electric means from the area on the sheet material defined by the image of the aperture, so that this area scans the sheet material transversely to the direction of movement of the material, and the transmission-reflection mirror is adapted to divide the reflected light between the two photo-electric means. The first and third discriminator circuits are adapted to provide an output pulse in response to an input signal that originated as a positive pulse from the first and second photo-electric means and that exceeds a predetermined voltage level, and the second and fourth discriminator circuits are adapted to provide an output pulse in response to an input signal that originated as a negative pulse from first and second photo-electric means and that exceeds a predetermined voltage level. The first coincidence circuit is adapted to indicate the simultaneous presence of a signal from the first and third discriminator circuits, and the second coincidence circuit is adapted to indicate the simultaneous presence of a signal from the second and fourth discriminator circuits. In this way indications of flaws in the material are obtained from at least one of the two coincidence circuits.

According to another embodiment of the invention an amplifier is connected to the outputs of the first and second coincidence circuits and is adapted to add the signals received from these coincidence circuits. A third coincidence circuit may be connected to the amplifier and a gating generator circuit will then be connected to the third coincidence circuit. The gating generator circuit is adapted to be triggered by the reflection means to provide an output signal only while the combined image of the two photo-electric means is on the sheet material. The third coincidence circuit is adapted to indicate the simultaneous presence of a signal from the amplifier and from the gating generator circuit. Fluctuations in the intensity of the reflected light caused by flaws in the sheet material will be indicated by the third coincidence circuit and any false signals caused by scanning beyond the inspection area will be blocked in the third coincidence circuit.

According to another embodiment of the invention additional amplifiers together with a low pass and a high pass filter may be connected electrically between each of the photo-electric means and the discriminators. The filters are adapted to reduce the strength of undesired signals.

The undesired signals picked up by the two photo-electric means will be reduced by the filters to a level below that required to actuate the discriminator and any undesired signals generated in the electronic circuits between the optical system and the coincidence circuit, even though they may be large enough to actuate one of the discriminators, will be blocked in the coincidence circuits. The electronic circuits provide an undistorted pulse each time a flaw in the sheet material is detected by the photo-electric means and the sensitivity of the apparatus to undesired signals is greatly reduced.

A preferred embodiment of the invention will now be discussed with reference to the attached drawings in which, Figure 1 is a schematic diagram representing apparatus for optically examining paper and converting the optical information to electrical information, and Figure 2 is a block diagram illustrating electronic circuits for amplifying the desired signals and suppressing undesired signals.

Apparatus for optically examining paper for flaws and converting the optical information to electrical information is illustrated in Figure 1. The paper 10 is advanced through an inspection area in a plane that is normal to the plane of Figure 1. The paper in the inspection area is illuminated by a series of mercury vapor lamps 11 which are positioned so that the light rays 12 strike the paper at an angle of approximately 30° with reference to the plane of the paper. This provides sufficient illumination and also makes wrinkles easier to detect by casting shadows. A series of mirrors, 40, 41, 42 and 43 are mounted on a rotating frame 44 which is positioned above the paper 10 in the inspection area. In the position shown in Figure 1 the light from a small area 45 (approximately one-sixteenth by five-sixteenths of an inch) of the paper is reflected by the mirror 40 to a 50% transmission-reflection mirror 18 which divides the light between the two photo-electric means 13 and 14. As the frame 44, and consequently the mirror 40, rotates, the illumination reflected from the paper is scanned in a strip by the photo-electric means 13 and 14 across the paper 10 until the edge of the paper is reached (the optical path at this instant is indicated by the dotted line 15). On further rotation of the frame 44 the mirror 40 will rotate out of the direct vision of the photo-electric means 13 and 14, and the mirror 43 will rotate into the direct vision of the photo-electric means 13 and 14 (the optical path at this instant is shown by a dotted line 16 in Figure 1). When the frame 44 and the mirrors 40, 41, 42 and 43 are continuously rotated, the paper 10 will be continuously scanned transverse to the direction of movement of the paper 10. The rotation of the mirrors 40, 41, 42 and 43 provides scanning which is analogous to the horizontal component of the scanning of a television screen, and the motion of the paper 10 is analogous to the vertical component of the scanning of a television screen, so that the paper 10 is continuously scanned in scanning lines. Thus, all of the paper 10 is scanned as along as the paper does not advance through the inspection area more than approximately one-quarter of an inch during the time of one scanning line. For example, with 240 scanning lines per second the paper may be advanced through the inspection area at a rate of approximately 300 feet per minute.

The condensing lens 20, the double concave lens 17, the transmission-reflection miror 18 and the photo-electric means 13 and 14 are enclosed in a case 19, which has an open end facing the rotating frame 44. The case 19 shields the photo-electric means 13 and 14 from undesired light sources such as external lighting. The instantaneous output potentials of the photo-electric means 13, 14, which may be photo-electric tubes or cells and conventional electron multipliers, are then dependent on the intensity of the reflected light.

When the scanning beam is examining a sheet of uniformly illuminated paper of constant quality without defects, then the electrical potential of the output of the photo-electric means 13, 14 will be theoretically constant. If a defect such as an oil spot passes the scanning area the intensity of the light reflected to the photo-electric means 13, 14 will vary, thus causing a change (usually a pulse) in the output potential of the photo-electric means.

Many undesired signals may be picked up by an apparatus of this type, for example, if the illumination of the paper 10 is not constant along the scanning line then a signal whose frequency will be dependent on the scanning frequency and the light distribution will appear in outputs of the photo-electric means 13 and 14. The amplitude of this signal will be dependent on the light distribution. The frequency of the power supplied to the illumination means 11 may result in cyclic changes in the potential at the outputs of the photo-electric means 13 and 14. The amplitude of this signal may be reduced by driving the rotating mirrors 40, 41, 42 and 43 at a synchronous speed (usually 1800 or 3600 revolutions per minute). In addition to these undesired signals the electron multipliers and amplifiers required to amplify the desired signals will introduce random noise signals.

Electronic circuits to detect the desired signals in the outputs of the photo-electric means and to suppress undesired signals are illustrated in Figure 2. The output signals of the electron multiplier 21, which may be a part of the photo-electric means 13, are amplified and filtered by the amplifiers and filter circuits 23, 25, 27 before being presented to the inputs of the positive and negative Schmitt-circuit discriminators 29 and 30. The Schmitt circuit is described in an article entitled "A thermionic trigger" by O. H. Schmitt in the Journal of Scientific Instruments, volume 15, January 1938, at page 24. The output signals of the electron multiplier 22, which may be a part of the photo-electric means 14, are amplified and filtered by the amplifiers and filter circuits 24, 26, 28 before being presented to the inputs of the positive and negative Schmitt-circuit discriminator 31 and 32. The positive discriminators 29 and 31 are adapted to provide an output pulse in response to an input signal that originated as a positive pulse from the photo-electric means 13 and 14, and that exceeds a predetermined voltage level, and the negative discriminators 30 and 32 are adapted to provide an output pulse in response to an input signal that originated as a negative pulse from the photo-electric means 13 and 14, and that is more negative than a predetermined voltage level. The high pass filters 25 and 26 are designed to attenuate the 60 cycle or 120 cycle signals due to the main frequency along with other undesired low frequency signals, and the low pass filters employed in the amplifiers 27 and 28 are designed to attenuate the high frequency noise commonly generated in electron multipliers and amplifiers. Filters of this nature tend to deform the normal pulse type signal caused by flaws in the paper, however, this is not serious in the present invention due to the type of discriminators used.

When a flaw in the paper is detected by the scanning system (Figure 1), a pulse of voltage appears at the outputs of both of the electron multipliers 21 and 22 (Figure 2). These pulses are then amplified and filtered, as described above, to increase the signal to noise ratio and are presented to the inputs of all four of the discriminators 29, 30, 31 and 32. If the pulses presented to the four discriminators originated as positive pulses at the photo-electric means 13 and 14 they will be passed by the discriminators 29 and 31 and consequently by the coincidence circuit 33; if the pulses originated as negative pulses at the photo-electric means 13 and 14 they will be passed by the discriminators 30 and 32 and consequently by the coincidence circuit 34; and if the pulses contained a positive and a negative component, then both of the coincidence circuits 33 and 34 will present an output signal. However, any noise generated between the optical system and the discriminators in either of the branches of amplifiers, even though it may be large enough in amplitude to pass through one of the discriminators, will be blocked in the coincidence circuits, consequently the outputs of the coincidence circuits will be substantially noise free. The outputs from these two coincidence circuits are added in a conventional addition circuit 35, and are passed to a coincidence circuit 36. A gating generator circuit 37, of well known design, is also connected to the coincidence circuit 36 and is adapted to be triggered by the rotating frame 44 of the mirrors 40, 41, 42 and 43 (Figure 1) to supply an output signal only while the paper is being scanned by the photo-electric means 13 and 14. Thus, any false signals that might occur due to scanning beyond the inspection area or during the transient time while one of the mirrors is rotating out of the direct vision of the photo-electric means 13 and 14 and while a second mirror has rotated into the direct vision of this photo-electric means, will be blocked in the coincidence circuit 36. The output of this coincidence circuit then will be dependent on flaws in the paper detected by the optical system of Figure 1, and will be free of noise picked up in the optical system or generated in the electronic circuits. The output of the coincidence circuit 36 may be employed in a conventional utilization circuit 38 to control conventional equipment which is adapted to sort out the defective paper.

What we claim as our invention is:

1. A flaw detector for continuous sheet material comprising means for advancing the sheet material past an inspection area, means for illuminating the continuous sheet material in the inspection area, two photo-electric means, a first coincidence circuit connected to the outputs of the two photo-electric means, a second coincidence circuit connected to the output of the first coincidence circuit, a gating generator circuit connected to the second coincidence circuit, reflection means adapted to reflect light from a small area of the sheet material onto each photo-electric means, the reflection means being adapted to scan the sheet material transverse to the direction of movement of the continuous sheet material, the gating generator circuit being adapted to be triggered by the reflection means to supply an output signal only while light is being reflected from the sheet material, the first coincidence circuit being adapted to provide an output signal in response to the simultaneous presence of a signal from each of the photo-electric means, and the second coincidence circuit being adapted to indicate the simultaneous presence of a signal from the first coincidence circuit and from the gating generator circuit.

2. Apparatus as claimed in claim 1 wherein at least one discriminator circuit is connected between each of the photo-electric means and the first coincidence circuit, each discriminator circuit being adapted to provide an output signal in response to an input signal which exceeds a predetermined voltage level.

3. A flaw detector for continuous sheet material comprising means for advancing the sheet material past an inspection area, means for illuminating the sheet material in the inspection area, a first and a second photo-electric means, a first and a second discriminator circuit connected to the output of the first photo-electric means, a third and a fourth discriminator circuit connected to the output of the second photo-electric means, a first coincidence circuit connected to the outputs of the first and third discriminator circuits, a second coincidence circuit connected to the second and fourth discriminator circuits, reflection means adapted to reflect light from a small area of the continuous sheet material onto each of the photo-electric means, the reflection means being adapted to scan the sheet material transverse to the direction of movement of the continuous sheet material, a transmission-reflection mirror positioned between the two photo-electric means and the reflection means, the transmission-reflection mirror being adapted to divide the light between the two photo-electric means, the first and third discriminator circuits being adapted to provide an output pulse in response to an input signal that originated as a positive pulse from the first and second photo-electric means and that exceeds a predetermined voltage level, the second and fourth discriminator circuits being adapted to provide an output pulse in response to an input signal that originated as a negative pulse from the first and second photo-electric means and that exceeds a predetermined voltage level, the first coincidence circuit being adapted to indicate the simultaneous presence of a signal from the first and third discriminator circuits, the second coincidence circuit being adapted to indicate the simultaneous presence of a signal from the second and fourth discriminator circuits, whereby indications of flaws in the continuous sheet material may be indicated by at least one of the two coincidence circuits.

4. Apparatus as claimed in claim 3 wherein an amplifier is connected to the outputs of the first and second coincidence circuits, a third coincidence circuit is connected to the output of the amplifier, a gating generator circuit is connected to the third coincidence circuit, the amplifier being adapted to add the signals from the first and second coincidence circuits, the gating generator circuit being adapted to be triggered by the reflection means to supply an output signal only while said image is on the continuous sheet material, the third coincidence circuit being adapted to indicate the simultaneous presence of a signal from the amplifier and from the gating circuit.

5. An apparatus as claimed in claim 4 wherein a second amplifier, a first low pass filter, and a first high pass filter are connected in series between the first photo-electric means and the first and second discriminator circuits; a third amplifier, a second low pass filter, and a second high pass filter are connected in series between the second photo-electric means and the third and fourth discriminator circuits.

References Cited in the file of this patent

UNITED STATES PATENTS

| | | |
|---|---|---|
| 2,370,160 | Hansell | Feb. 27, 1945 |
| 2,429,331 | Sachtleben | Oct. 21, 1947 |
| 2,486,334 | Slamar | Oct. 25, 1949 |
| 2,517,404 | Morton | Aug. 1, 1950 |
| 2,545,331 | Works | Mar. 13, 1951 |